Figure 1:
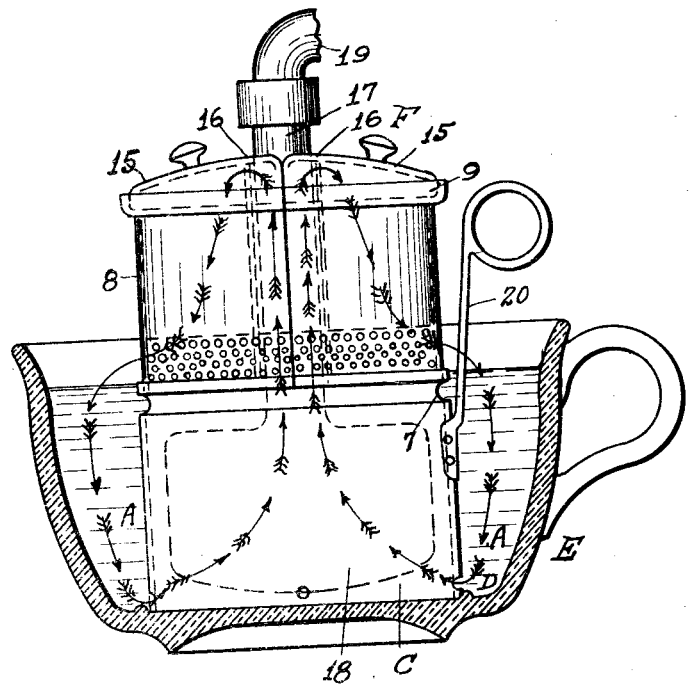

E. J. OVINGTON.
CULINARY APPARATUS.
APPLICATION FILED NOV. 8, 1911.

1,072,154.

Patented Sept. 2, 1913.

2 SHEETS—SHEET 1.

Witnesses:
W. T. Seemann
H. M. Fulmer

Inventor:
Edward J. Ovington,
By Beckert Blakeslee,
his Attorneys.

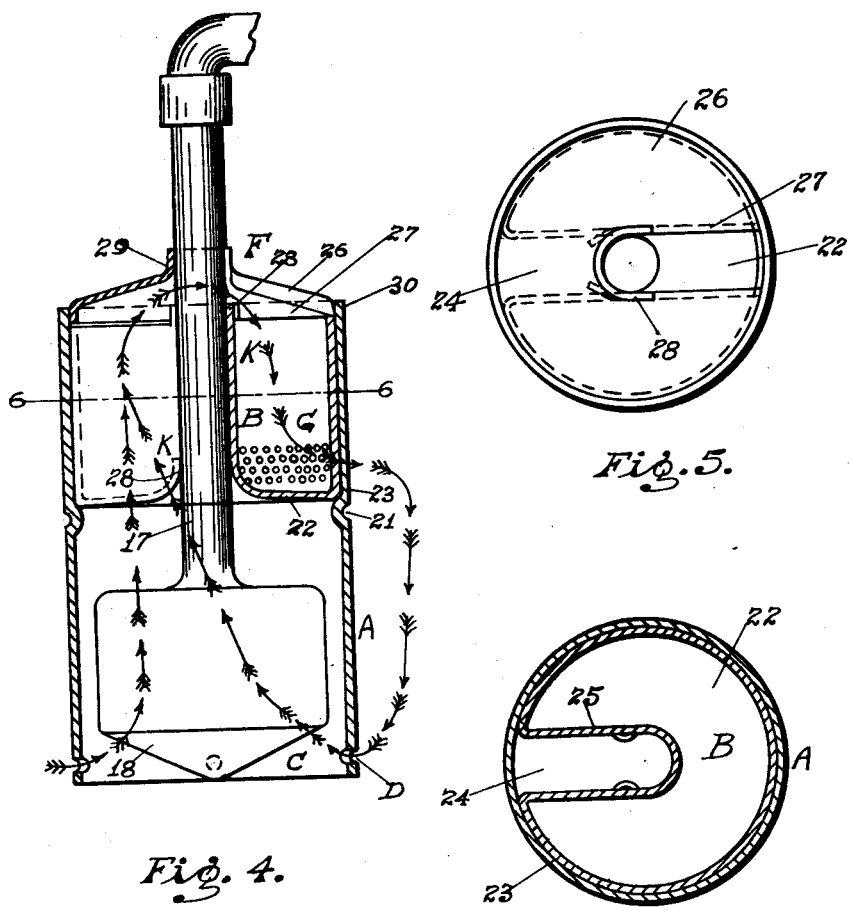

UNITED STATES PATENT OFFICE.

EDWARD J. OVINGTON, OF LOS ANGELES, CALIFORNIA, ASSIGNOR, BY MESNE ASSIGNMENTS, TO SIMPLEX ELECTRIC HEATING COMPANY, OF CAMBRIDGE, MASSACHUSETTS, A CORPORATION OF MASSACHUSETTS.

CULINARY APPARATUS.

1,072,154.   Specification of Letters Patent.   Patented Sept. 2, 1913.

Application filed November 8, 1911. Serial No. 659,191.

*To all whom it may concern:*

Be it known that I, EDWARD J. OVINGTON, a citizen of the United States, residing at Los Angeles, in the county of Los Angeles and State of California, have invented new and useful Improvements in Culinary Apparatus, of which the following is a specification.

This invention relates to culinary apparatus, and more particularly to apparatus or devices for speedily brewing or preparing coffee, tea and similar beverages; and the invention has for its object to provide improvements of the general character stated, which will be superior in point of simplicity, inexpensiveness of construction, economy in use, durability and convenience, and which will be generally superior in efficiency and serviceability.
As far as I am aware, the invention, in its broader aspects, contemplates the provision of means or apparatus whereby a single cup or portion of tea or coffee or the like may be prepared or brewed in the cup in which it is to be served. In carrying the invention into effect, I utilize the well known percolator method, which involves the employment of a suitable receptacle in which the tea or coffee leaves or grains are held and through and over which a stream of hot water is passed, the liquor being thus produced and, in accordance with the present invention, being directed into and directly received by the cup within which the percolator features, together with a suitable source of heat, are disposed. I have found that there is a great demand for such a device or apparatus, simple and compact in form and readily kept clean and sanitary, and whereby, upon a moment's notice, a cup of coffee or the like may be prepared, and may thereupon be consumed directly from the cup within which it is prepared, upon withdrawal of the percolator features and source of heat. I preferably apply an electrical heater to supply the necessary heat units, and it results that wherever electrical current is available any one supplied with my improved means or apparatus may, within a few minutes, prepare and make ready for consumption a hot and thoroughly satisfactory cup of coffee, tea or the like.

With the above and other general and particular objects in view, and with the above features and elements entering into the organization thereof, the invention consists in the novel provision, formation, construction, association, application and relative arrangement of parts, members and features all as hereinafter described, shown in the drawings, and finally pointed out in claims.

Figure 2:
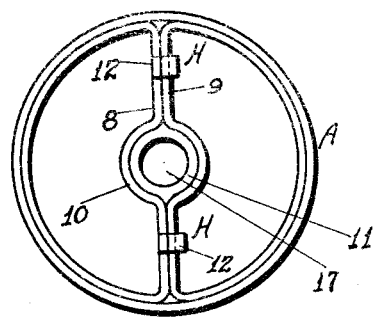
Figure 3:
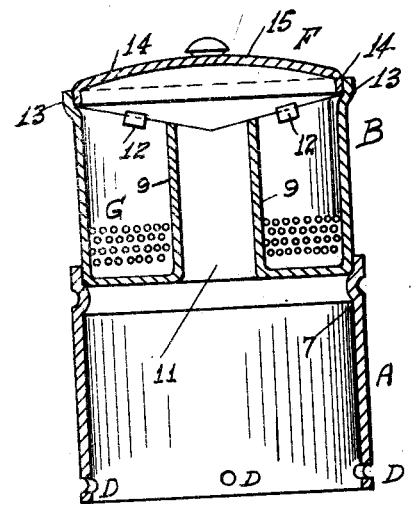

In the drawings:—Figure 1 is a side view, partly in vertical section, of a tea or coffee cup and of culinary means or apparatus, organized in accordance with the invention, and in operative position within the cup; Fig. 2 is a top plan view thereof with the covers removed; Fig. 3 is a vertical transverse sectional view thereof, taken at right angles, to the plane of section of Fig. 1; Fig. 4 is a view similar to Fig. 1, of a modified form of construction; Fig. 5 is a top plan view thereof; and, Fig. 6 is a transverse sectional view thereof, taken upon the line 6—6, Fig. 4, and looking downwardly.

Corresponding parts in all the figures are designated by the same reference characters.

Referring with particularity to the drawings, the culinary means or apparatus shown therein as illustrating two embodiments of the invention, comprise, in the main, a tubular body A, a percolator member B which fits within or rests upon the tubular body, and heat supply means C disposed within the tubular body A and beneath the percolator member B. The tubular body A is provided with inlet ports D, formed adjacent to the lower portion thereof, and through which water in the cup E enters the tubular body and is forced upwardly through the same into the percolator member B, by the ebullition caused by the heat supply means C within the tubular body. A cover F is preferably provided above the percolator member B, confining the liquid, steam, and heat beneath the same. Essential to each form of percolator member B are a plurality of perforations or openings G which are formed in the percolator member, or the tubular body surrounding the same, and through which the liquor brewed in the percolator member flows outwardly into the cup E. Within the period of time, say four minutes, consumed in brewing the cup of tea or the like, the water first supplied within the cup E is caused to pass through the ports D, through the tubular body A, upwardly, downwardly through the percolator member B, and outwardly through the openings G and into the cup E, with the result that the water initially in the cup is eventually converted, under the action of heat, and by the addition of the qualifying material, such as tea or coffee in the percolator member, into a satisfactory cup of tea or the like.

Referring to Figs. 1, 2 and 3, the tubular body A is provided adjacent to its top with an inwardly directed bead 7 upon which rests the lower end of two segmental, semicircular casings, 8 and 9 respectively, which fit tightly together and are provided with registering opposed semi-circular walls 10 forming a central vertical passage 11. The casings 8 and 9 constitute jointly the percolator member B, and are closed at the bottom and sides, with the exception of a series of the openings G in the sides adjacent to the bottom, and are open at the top. The openings G are arranged in a plane above the top of the tubular body A which is preferably open at both top and bottom. H designates holding means for detachably uniting the casings 8 and 9, the same preferably comprising spring clips 12 fitting over the tops of the opposed straight walls of the casings 8 and 9. The outer segmental walls of said casings are provided with offset portions 13 which receive the flanged edges 14 of segmental and semi-circular covers 15 cut away centrally, as at 16, to form an opening registering with the opening 11, within which opening is accommodated the stem 17 of the heat supply means C, which is indicated as an electrical heater, having a bulbous head 18 disposed within the tubular body A, beneath the percolator member B, and a stem 17 rising from the head 18 and inclosing the electrical conductors 19. The opening 11 is larger than the diameter of the stem 17, so that liquid may pass upwardly through the opening 11 and flow over the tops of the opposed walls of the casings 8 and 9 into said casings and upon the tea leaves or coffee grains or the like therein. A handle 20 is preferably applied to the tubular body A, and rises above the rim of the cup E in position to be grasped for the purpose of lifting the entire means or apparatus out of the cup or lowering the same therein.

Referring to Figs. 4, 5 and 6, the tubular body A is open at the top and bottom, and provided adjacent to the bottom with the series of ports D, and with an inwardly directed bead 21 substantially midway of its height. The percolator member B comprises a segmental disk 22 having an upstanding edge wall 23 closely fitting within the tubular body A; such segmental formation providing a lateral opening 24 produced through the disk slightly beyond the center thereof and having straight opposed side walls, and a curved inner wall. The disk 22 has an up-standing shield 25 rising from the confining walls of the opening 24, and substantially U-shaped in cross section as shown in Fig. 6. The cover F consists of a disk 26 formed into an up-rising crown and having a lateral opening 27, similar to the opening 24. Holding means K are provided for connecting the shield 25 with the stem 17 of the heat supply means C; said holding means comprising clips 28 detachably and yieldingly embracing the stem 17. The cover F is provided with holding means L comprising a similar clip 29 which embraces the stem 17. The disk 26 is provided with a down-turned edge flange 30 fitting closely within the top of the tubular body A. The plurality of openings G in this form of construction are provided in the wall of the tubular body A above the disk 22, in a circular series. The heating means C is provided with the bulbous head 18 disposed within the tubular body A beneath the disk 22.

In each form of construction, water enters the tubular body A beneath the percolator member B, and the heating means C causes the water in the lower portion of the tubular member to boil, whereby it is forced upwardly, in one case through the opening 11 and into the casing 8 and 9, and in the other case through the opening 24 and between the walls of the shield 25, and over the top of said shield onto the disk 22. Within the casings 8 and 9, and upon the disk 22, is placed tea leaves or coffee grains or the like, and the hot water coming in contact with the same extracts the virtue thereof, producing the required liquor, which flows outwardly from the percolator member through the openings G, and thence flows into the cup E. As the boiling within the tubular body around the heat supply means progresses, and the water is forced upwardly and into the percolator member, as last related, it is replaced by water flowing in at the bottom of the cup through the ports D. The process continues until all of the water has been transformed into the beverage desired. The entire means or apparatus is then withdrawn from the cup, and the contents is seasoned or further added to as desired, and is then ready for consumption. The base of the tubular body constitutes the support for the entirety within the cup.

The several parts of each form of construction may readily be detached for cleansing, as will be manifest, and they can conveniently be packed for storage or shipment in assembled or disconnected relation.

The covers F inclose the apparatus in Figs. 1, 2 and 3, at the top, so as to produce a closed working system within which the steam produced helps the proper flow and circulation of the hot water.

It is manifest that the means described are extremely simple in organization and convenient and effective in use, and the use of the same obviates the necessity of employing elaborate boiling or percolating or other apparatus in order to quickly produce a fresh and satisfactory cup of beverage.

I do not desire to be understood as limiting myself to the specific provision, construction, combination, association and organization of parts, members and features shown and described; but reserve the right to vary the same, in adapting the improvements to varying conditions of use, without departing from the spirit of the invention and the terms of the following claims.

Having thus described my invention I claim and desire to secure by Letters Patent—

1. Improvements of the character described, comprising a tubular body, means for holding coffee or the like therein at a point above the bottom of the tubular body, heat supply means within the tubular body beneath said last named means, the tubular body being provided with openings for influx of water adjacent to the bottom thereof; and a cover for the whole; the tubular body constituting at its base the support for the entirety.

2. Improvements of the character described, comprising a tubular body, means for holding coffee or the like therein at a point above the bottom of the tubular body, heat supply means within the tubular body beneath said last named means, the tubular body being provided with openings for influx of water adjacent to the bottom thereof; said tubular body and the other parts being detachably connected, the tubular body constituting at its base the support for the entirety.

3. Improvements of the character described, comprising a tubular body provided at the bottom with a port for the influx of water, a casing detachably connected with the top of the tubular body and communicating therewith, and heat supply means removably disposed in the tubular body beneath the casing; there being openings in the casing above the tubular body, and a cover for the whole; the tubular body constituting at its base the support for the entirety.

4. Improvements of the character described, comprising a tubular body provided at the bottom with a port for the influx of water, a casing detachably connected with the top of the tubular body and communicating therewith, heat supply means removably disposed in the tubular body beneath the casing; there being openings in the casing above the tubular body, and a cover for the whole; said heat supply means comprising an electrical heater having a working portion disposed beneath the casing and a stem rising above the casing.

5. Improvements of the character described, comprising a tubular body provided at the bottom with a port for the influx of water, a casing detachably connected with the top of the tubular body and communicating therewith, heat supply means removably disposed in the tubular body beneath the casing; there being openings in the casing above the tubular body; and a cover for the whole; said heat supply means comprising an electrical heater having a working portion disposed beneath the casing and a stem rising above the casing; and a cover for the whole provided with an opening accommodating said stem.

6. Improvements of the character described, comprising a tubular body having a port at the bottom for the influx of water, two casings detachably fitting the top of the tubular body, there being perforations in the side walls of the casings above the tubular body; holding means detachably connecting the casings, a cover for the casings, and an electrical heater provided with a working portion disposed within the tubular body and with a stem projecting through an opening in the cover; said casings being spaced in part to provide an opening through which the stem rises and which permits liquid circulation between the tubular body and the casings.

7. Improvements of the character described, comprising a tubular body having a port at the bottom for the influx of water, two casings detachably fitting the top of the tubular body, there being perforations in the side walls of the casings above the tubular body, holding means detachably connecting the casings, a cover for the casings and an electrical heater provided with a working portion disposed within the tubular body and with a stem projecting through an opening in the cover; said casings being spaced apart to provide an opening through which the stem rises and which permits liquid circulation between the tubular body and the casings; said tubular body being provided with a handle.

8. Improvements of the character described, comprising a container having a holder for coffee or the like, there being a water-heating chamber within the container and there being an opening between said chamber and said holder; and a heater within said chamber and provided with an extension accommodated by said opening and laterally removable therefrom.

9. Improvements of the character described, comprising a container having a holder for coffee or the like, there being a water-heating chamber within the container and there being an opening between said chamber and said holder; and an electrical heater with an extension accommodated by said opening.

In testimony whereof, I have signed my name to this specification in the presence of two subscribing witnesses.

EDWARD J. OVINGTON.

Witnesses:
  RAYMOND J. BLAKESLEE,
  CHARLES D. WARDEN.

Copies of this patent may be obtained for five cents each, by addressing the "Commissioner of Patents, Washington, D. C."